US012108311B2

(12) United States Patent
Yan

(10) Patent No.: US 12,108,311 B2
(45) Date of Patent: Oct. 1, 2024

(54) VEHICULAR APPARATUS, AND TIME SYNCHRONIZATION METHOD FOR VEHICULAR APPARATUS

(71) Applicant: DENSO CORPORATION, Aichi (JP)

(72) Inventor: Jiaqing Yan, Kariya (JP)

(73) Assignee: DENSO CORPORATION, Kariya (JP)

( * ) Notice: Subject to any disclaimer, the term of this patent is extended or adjusted under 35 U.S.C. 154(b) by 627 days.

(21) Appl. No.: 17/336,787

(22) Filed: Jun. 2, 2021

(65) Prior Publication Data

US 2021/0289328 A1 Sep. 16, 2021

Related U.S. Application Data

(63) Continuation of application No. PCT/JP2020/000300, filed on Jan. 8, 2020.

(30) Foreign Application Priority Data

Feb. 1, 2019 (JP) ................. 2019-017071

(51) Int. Cl.
*H04W 4/40* (2018.01)
*G06F 1/10* (2006.01)
*G06F 9/455* (2018.01)
*H04W 56/00* (2009.01)

(52) U.S. Cl.
CPC ............. *H04W 4/40* (2018.02); *G06F 1/10* (2013.01); *G06F 9/45558* (2013.01); *H04W 56/002* (2013.01); *G06F 2009/45595* (2013.01)

(58) Field of Classification Search
CPC ......... H04W 4/40; H04W 56/002; G06F 1/10; G06F 9/45558; G06F 2009/45595

USPC .............................................. 701/1
See application file for complete search history.

(56) References Cited

U.S. PATENT DOCUMENTS

| 6,792,466 B1 * | 9/2004 | Saulpaugh | H04L 63/126 |
| | | | 709/227 |
| 8,265,042 B1 * | 9/2012 | Nguyen | H04J 3/0658 |
| | | | 370/336 |
| 9,819,593 B1 * | 11/2017 | Vetter | G06F 21/83 |
| 10,565,864 B2 * | 2/2020 | Benhammou | G08G 1/096783 |
| 2003/0135541 A1 * | 7/2003 | Maeda | H04L 67/1095 |
| | | | 709/248 |
| 2005/0193124 A1 * | 9/2005 | Chou | H04L 65/1104 |
| | | | 709/228 |
| 2009/0182805 A1 * | 7/2009 | Shivaji-Rao | G06F 16/182 |
| | | | 709/203 |

(Continued)

FOREIGN PATENT DOCUMENTS

| EP | 2348688 A1 * | 7/2011 | ......... H04L 65/1006 |
| JP | 2007170867 A | 7/2007 | |

(Continued)

*Primary Examiner* — Tuan C To
(74) *Attorney, Agent, or Firm* — Harness, Dickey & Pierce, P.L.C.

(57) ABSTRACT

A vehicular apparatus operates a plurality of operating systems concurrently on a single hardware module. Each operating system is operated based on a corresponding own clock function holding a time. The vehicular apparatus is provided with a synchronization unit for synchronizing the times of the respective operating systems by issuing, to each operating system, a notification indicating a change in the time made in one operating system.

14 Claims, 9 Drawing Sheets

(56) References Cited

U.S. PATENT DOCUMENTS

| | | | |
|---|---|---|---|
| 2011/0191011 A1* | 8/2011 | McBride | H04W 28/06 701/117 |
| 2014/0130042 A1* | 5/2014 | Luxenberg | G06F 9/45558 718/1 |
| 2016/0292179 A1* | 10/2016 | von Muhlen | G06F 16/176 |
| 2017/0078384 A1* | 3/2017 | Trandafir | G06F 16/178 |
| 2017/0124170 A1* | 5/2017 | Koorapati | G06F 16/27 |
| 2018/0074465 A1 | 3/2018 | Kitamura | |
| 2018/0288807 A1 | 10/2018 | Yamashiro et al. | |
| 2019/0097744 A1* | 3/2019 | Abdullah | H04J 3/0673 |
| 2023/0300213 A1* | 9/2023 | Ikushima | H04L 67/55 709/219 |

FOREIGN PATENT DOCUMENTS

| | | | | |
|---|---|---|---|---|
| JP | 2012-113504 A | 6/2012 | | |
| JP | 2014134989 A | 7/2014 | | |
| JP | 2018044842 A | 3/2018 | | |
| JP | 2018112425 A | 7/2018 | | |
| WO | WO-2015186220 A1 | 12/2015 | | |
| WO | WO-2017061203 A1 | 4/2017 | | |
| WO | WO-2018067817 A1 * | 4/2018 | | G06F 1/14 |

\* cited by examiner

LOG FILE

POSITION : 2010/01/01 10:00.00    34.991022, 137.009875
SPEED : 2010/01/01 10:00.00    20.00Km/h
POSITION : 2010/01/01 10:00.01    34.991022, 137.009876
SPEED : 2010/01/01 10:00.01    20.10Km/h

VEHICULAR APPARATUS, AND TIME SYNCHRONIZATION METHOD FOR VEHICULAR APPARATUS

CROSS REFERENCE TO RELATED APPLICATIONS

The present application is a continuation application of International Patent Application No. PCT/JP2020/000300 filed on Jan. 8, 2020, which designated the U.S. and claims the benefit of priority from Japanese Patent Application No. 2019-017071 filed on Feb. 1, 2019. The entire disclosures of all of the above applications are incorporated herein by reference.

TECHNICAL FIELD

The present disclosure relates to a vehicular apparatus and a time synchronization method for the vehicular apparatus.

BACKGROUND

Vehicles are provided with a clock function in order to present the time to the user and to operate the in-vehicle system correctly. For example, there is disclosed a technology to maintain an accurate time by synchronizing with an external network time protocol server. Hereinafter, the network time protocol is also referred to as NTP.

SUMMARY

According to an example of the present disclosure, a vehicular apparatus is provided to operate a plurality of operating systems concurrently on a single hardware module. Each operating system is operated based on a corresponding own clock function holding a time. The vehicular apparatus is provided with a synchronization unit for synchronizing the times of the respective operating systems by issuing, to each operating system, a notification indicating a change in the time made in one operating system.

BRIEF DESCRIPTION OF DRAWINGS

The objects, features, and advantages of the present disclosure will become more apparent from the following detailed description made with reference to the accompanying drawings. In the drawings.

DETAILED DESCRIPTION

Figure 1:
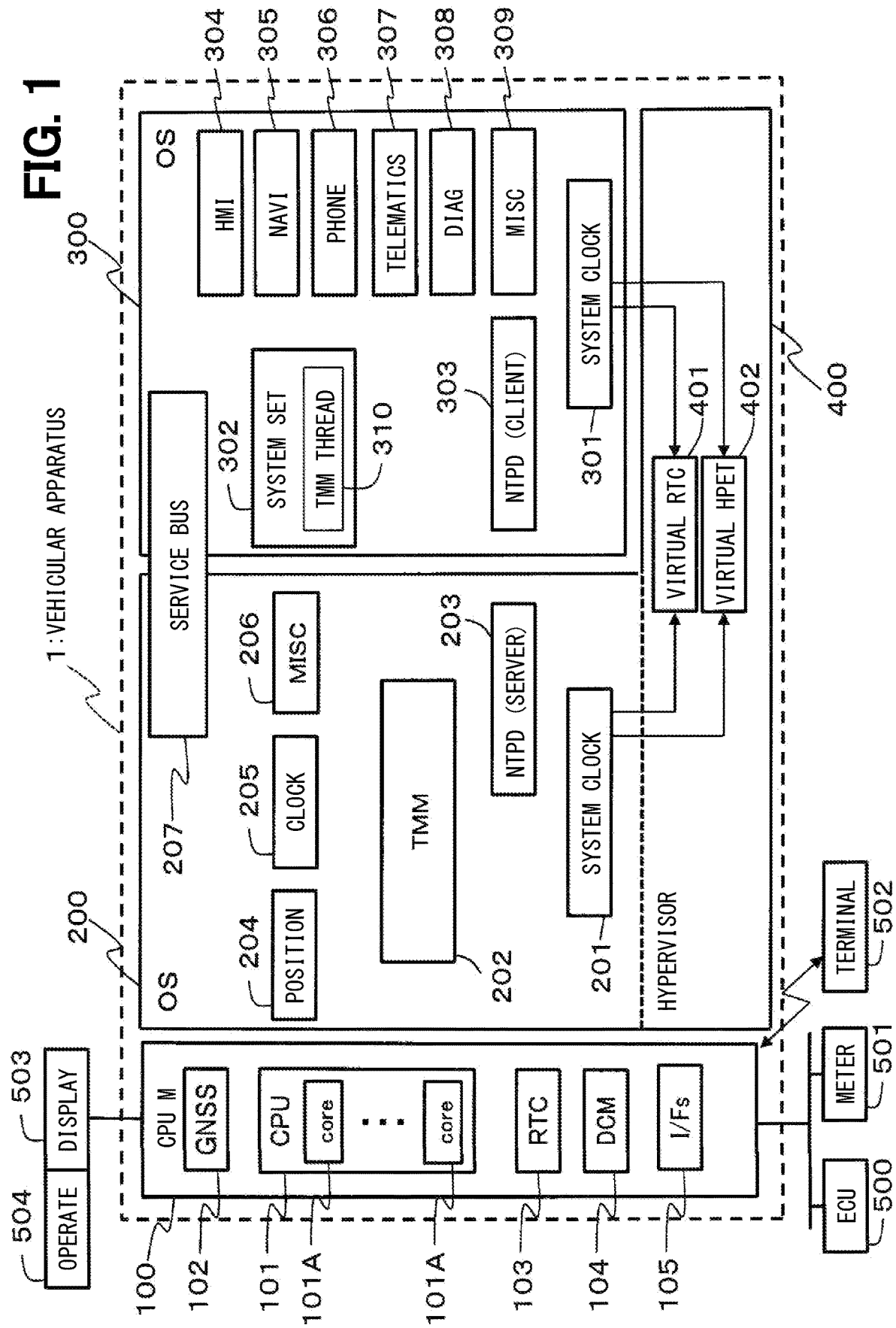
FIG. 1 is a diagram schematically showing a configuration of a vehicular apparatus as functional blocks.

Hereinafter, an embodiment will be described with reference to the drawings. As shown in FIG. 1, a vehicular apparatus 1 includes a single CPU module 100 as a hardware module. In the vehicular apparatus 1, a virtualized environment is provided in which a plurality of OSs 200 and 300 (i.e., Operating Systems 200 and 300) operate on the CPU module 100. Hereinafter, the operating system will be referred to as an OS. These OS 200 and OS 300 operate concurrently on a hypervisor 400.

The CPU module 100 is provided with physical (tangible) hardware elements or circuits such as a CPU 101, a GNSS module 102 (Global Navigation Satellite System module 102), an RTC 103 (Real Time Clock 103), a DCM 104 (Data Communication Module 104), and various interface group 105. The hardware elements or circuits mounted on the CPU module 100 are not limited thereto. For example, a storage unit such as a memory for storing computer programs is also mounted.

The CPU 101, which constitutes a main controller (i.e., the CPU module 100) in the vehicular apparatus 1, includes a plurality of cores 101A in the present embodiment. Similar to a general virtualized environment, the cores 101A are appropriately determined according to the processing capacity required by the OS 200 and the OS 300. The number of cores 101A and the allocation of cores 101A are appropriately selected according to the required performance and the like.

The GNSS module 102 receives signals from the artificial satellites of the global positioning satellite system. The GNSS module 102 is used to specify the position and time based on the received signals. The GNSS module 102 is provided as corresponding to a target system among various systems such as a GPS (Global Positioning System), a GLONASS (GLObal NAvigation Satellite System), Galileo, a quasi-zenith satellite system, and a BeiDou Navigation Satellite System.

The RTC 103 is a real-time clock and realizes a clock function (i.e., clock). The RTC 103 holds a time, which becomes a reference of the vehicular apparatus 1. Hereinafter, the time held in the RTC 103 will be referred to as a basic time of the vehicular apparatus 1 for convenience. A backup battery (not shown) is connected to the RTC 103; thereby the RTC 103 continues to hold the time even when the power of the vehicular apparatus 1 is turned off. This RTC 103 stores Greenwich Mean Time.

The DCM 104 is a data communicator apparatus for a vehicle, and communicates with a center located outside the vehicle or with another ECU 500 (Electronic Control Unit 500) located in the vehicle. For example, the DCM 104 is configured to transmit vehicle information collected from the ECU 500 to the center via a network, receive information from the center and notify the user, or connect automatically to the center and transmit the position and time if an accident were to occur.

The interface group 105 includes interfaces that perform various communications in the vehicle. The interface group 105 includes a wired system, a wireless system, or both the wired system and the wireless system. For example, the interface group 105 includes (i) a CAN interface that communicates with the ECU 500 or the meter 501, (ii) a wired interface such as USB that communicates with the portable terminal 502 held by the user, and (iii) a short-range wireless interface.

Further, the CPU module 100 is connected to the display apparatus 503. The display apparatus 503 displays an operation menu of the vehicular apparatus 1, the basic time, the execution results of various applications, and the like. However, the number of display apparatuses 503 is not limited to one, and a plurality of display apparatuses 503 can be connected to the vehicular apparatus 1.

Further, the CPU module 100 is connected to an operation apparatus 504 onto which a user's operation is input. The operation apparatus 504 is configured as an operation switch or a touch panel provided on the screen in the display apparatus 503, or a combination thereof. The meter 501 may be configured by, for example, a liquid crystal panel; the CPU module 100 may be configured to perform image generation processing and display processing of a speedometer or a rotation speedometer. That is, the display apparatus 503 connected to the vehicular apparatus 1 is not limited to one; namely, the vehicular apparatus 1 may be configured to be connected to a plurality of display apparatuses 503.

Next, the OS 200 and OS 300 will be described. Various computer programs are executed on the OS 200 and the OS 300. However, for the sake of brevity, in this embodiment, each of the computer programs executed by the OS 200 and the OS 300 is referred to as an application. When an application having a specific function is described, it is also referred to as a position application 204, a clock application 205, or the like, as will be described later, for example.

When operating a plurality of OSs in one vehicular apparatus 1, it is common practice to mix an OS that requires real-time performance and an OS that is excellent in general-purpose processing such as multimedia processing.

In this embodiment, a so-called real-time OS is adopted as the OS 200. This OS 200 is relatively excellent in real-time performance as compared with the OS 300, and executes an application requiring a high processing speed. In this case, the OS 200 operates based on the system clock 201 corresponding to the clock function or clock. That is, the OS 200 has a unique or own clock function that is not shared with the OS 300. The time held in the system clock 201 is the basic time of the OS 200.

On this OS 200, for example, (i) a TMM 202 (Time Management Module 202) serving as a synchronization unit, (ii) a server-side NTPD 203 (Network Time Protocol Daemon 203) serving as a server, (iii) a position application 204, (iv) a clock application 205, and the like are implemented. However, the applications implemented on the OS 200 are not limited to these. MISC applications 206 (MISCellaneous applications 206) required for the operation and control of the vehicular apparatus 1 and the OS 200 are additionally implemented.

The TMM 202 is a dedicated application that functions as a synchronization unit that synchronizes the time between the OS 200 and the OS 300. The TMM 202 has functions such as reading the time from RTC 103, rewriting or updating the time held by the RTC 103, accepting time change requests from each application, and notifying the other OS 300 (i.e., another OS 300 different from the OS 200 on which the TMM 202 itself is operating) of the time change after accepting the time change request. The details of this TMM 202 will be described later.

This TMM 202 is implemented on the OS 200. Therefore, in the vehicular apparatus 1, the time is synchronized in such a manner that the OS 200 becomes the master and the OS 300 becomes the slave. When three or more OSs are built on the CPU module 100, a similar environment can be built by using any one OS as a master and the other OSs as slaves.

The NTPD 203 is an application that functions as a so-called NTP server (Network Time Protocol server). The NTPD 203 provides a time (which may also be a server-holding time) held by the NTPD 203 itself in response to a request from a client-side NTPD 303 serving as a client provided on the OS 300. That is, in the vehicular apparatus 1, the time is synchronized using the NTP (Network Time protocol).

The position application 204 is an application that uses the GNSS module 102. The position application 204 has, for example, a function of specifying a current position and specifying an accurate time. That is, the position application 204 is an application that can acquire the time from the outside of the vehicular apparatus 1. In other words, the position application 204 and other applications that can acquire the time described below can acquire the accurate time that can change or correct the basic time (as a reference of the vehicular apparatus 1) held in the RTC 103.

The position application 204 has a function of changing the time of the vehicular apparatus 1 based on the specified time. However, as will be described later, in the present embodiment, the time change by the position application 204 is performed via the TMM 202 in the present embodiment.

Figures 2, 3:
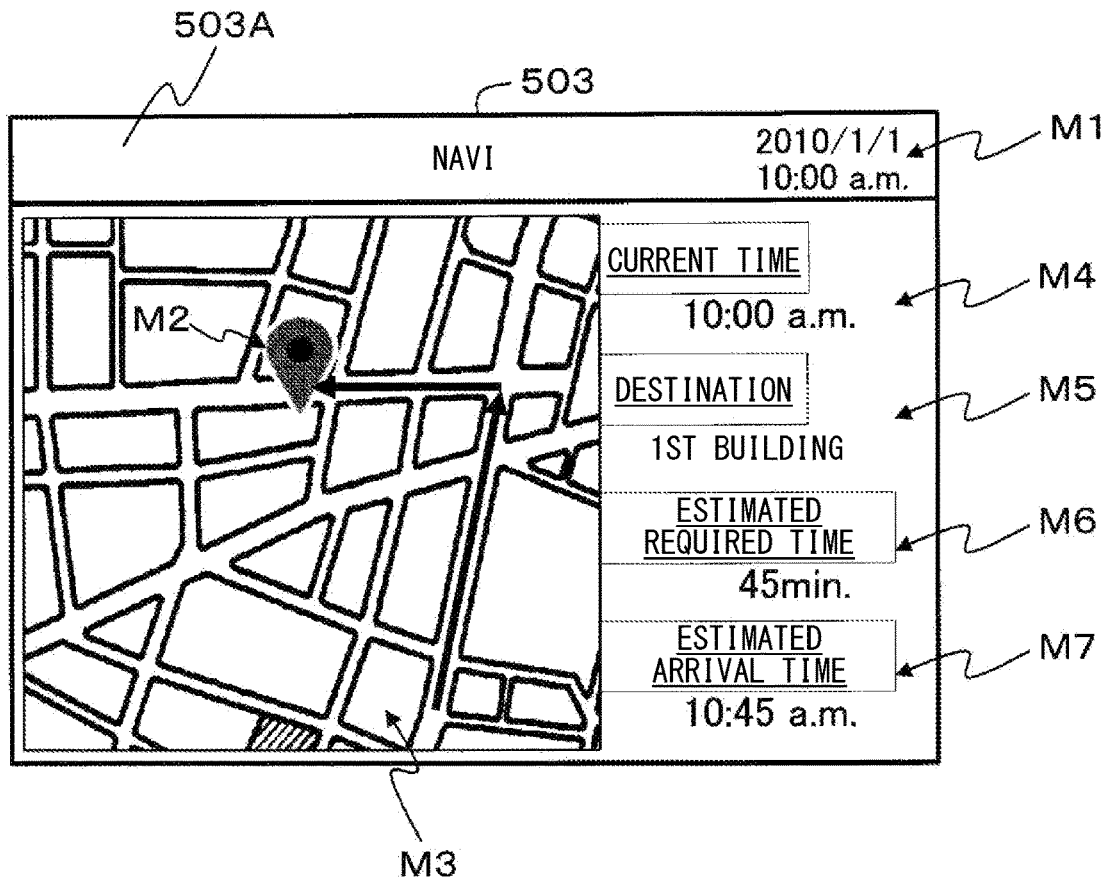
FIG. 2 is a diagram schematically showing an example of a display screen image.
FIG. 3 is a diagram schematically showing an example of diagnostic information.

The clock application 205 is an application having a function of displaying a basic time and a function of accepting a time change from a user. That is, the clock application 205 is an application capable of acquiring the time from the outside of the vehicular apparatus 1 and setting the time here. As shown in FIG. 2, the clock application 205 displays the current time M1 on the screen 503A of the display apparatus 503, for example, "2010/1/1 10:00 a.m." (i.e., Jan. 1, 2010, at 10:00 am). The display mode of the current time and the like is not limited to the example shown in FIG. 2, and any display mode that can be recognized by the user may be used.

In addition, the clock application 205 accepts a time change operation by the user. This change operation includes, for example, an operation of adjusting to the time of each country or region, and an operation of setting the time by the user himself/herself. However, as will be described later, in the present embodiment, the change in the time by the clock application 205 is performed via the TMM 202.

The OS 200 is configured to enable various types of communications with the OS 300 via a service bus 207 realized by software. The OS 300 is a so-called general-purpose OS, and an application that does not require a relatively high processing speed as compared with the OS 200. For instance, an application that requires general-purpose processing such as an image or a moving image, and the like are executed. In this case, the OS 300 operates based on the system clock 301 that realizes the clock function. That is, the OS 300 has a unique or own clock function that is not shared with the OS 200.

On this OS 300, for example, (i) a system setting application 302, (ii) a client-side NTPD 303 serving as a client, (iii) an HMI application 304, (iv) a navigation application 305, (v) a telephone application 306, (vi) a telematics application 307, (vii) a diagnostic application 308, and the like are implemented. However, the applications implemented on the OS 300 are not limited to these, and various MISC applications 309 required for the operation and control of the vehicular apparatus 1 and the OS 300 are implemented.

The system setting application 302 is an application that makes various settings for the OS. The system setting application 302 includes applications for making various settings in the OS. Further, as one example of the system setting application 302, a TMM thread 310 that performs processing related to changing the time in the OS is implemented.

The TMM thread 310 is an application that receives a notification from the TMM 202 on the OS 200. Although the details will be described later, the TMM thread 310 has a function of notifying an application such as the system clock 301 or the client-side NTPD 303 of the time change, which is notified from the TMM 202 by communicating with the TMM 202. The time held by the system clock 301 is the basic time of the OS 300. It can be said that the TMM thread 310 is also a part of the program constituting the synchronization unit along with the TMM 202.

The NTPD 303 is an application that functions as a so-called NTP client. The NTPD 303 acquires the time held by the server-side NTPD 203, which becomes the basic time on the OS 300, by communicating with the sever-side NTPD 203 implemented on the OS 200.

The HMI application 304 is an application that provides a human-machine interface. The HMI application 304 displays, for example, an operation menu of the vehicular apparatus 1 and receives an operation input from the operation apparatus 504. That is, the HMI application 304 is an application that can acquire the time from the outside of the vehicular apparatus 1 (here, set by the user), by linking with the clock application 205 on the OS 200.

The navigation application 305 is an application that realizes so-called car navigation such as route guidance to a destination. As shown in FIG. 2, for example, when the destination is set, the navigation application 305 displays a destination mark M2, a route guidance screen M3, a current time M4, a route M5 to the destination, an estimated required time M6, and an estimated arrival time M7, and the like. Note that FIG. 2 is an example of a navigation screen, and the information to be displayed and the display format are not limited to this.

The telephone application 306 is an application that enables the portable terminal 502 held by the user to be used from the vehicular apparatus 1. The telephone application 306 performs processing that operates by linking the vehicular apparatus 1 and the portable terminal 502, such as acquiring the time set in the portable terminal 502, so-called hands-free calling, displaying of mail received by the portable terminal 502, etc. That is, the telephone application 306 is an application that can acquire the time from the outside of the vehicular apparatus 1. However, the processing performed by the telephone application 306 is not limited to these.

The telematics application 307 is an application that collects vehicle information such as speed, position, and vehicle runout, and acquires information including time from an external center. That is, the telematics application 307 is an application that can acquire the time from the outside of the vehicular apparatus 1. The telematics application 307 performs processing such as analysis based on the collected vehicle information, and notification to the center in the event of a breakdown or accident. However, the processing performed by the telematics application 307 is not limited to these.

The diagnostic application 308 is an application that records a log of the vehicular apparatus 1. The diagnostic application 308 performs processing such as recording the collected vehicle information in chronological order and recording events that occur in the application. However, the processing performed by the diagnostic application 308 is not limited to these.

For example, as shown in FIG. 3, the diagnostic application 308 records, as a log M13, (i) the current position information M10 acquired on the OS 200 and (ii) the vehicle information M11 such as speed collected from another ECU 500 on the OS 300, with a time stamp M12. In FIG. 3, the following is recorded: the vehicle is traveling at a speed of 20.00 km/h at latitude 34.991022 degrees north and longitude 137.009875 degrees east at 10:00:00 on Jan. 1, 2010. The log M13 shown in FIG. 3 is an example, and the information collected and recorded by the diagnostic application 308; its recording mode are not limited to this.

The hypervisor 400 is an application that operates one or more OSs in a virtualized environment. In this embodiment, the hypervisor 400 is realized by the function provided in the OS 200. Therefore, strictly speaking, the vehicular apparatus 1 has a configuration in which the OS 200 operates on the CPU module 100 and the OS 300 operates on the hypervisor function of the OS 200.

On this hypervisor 400, (i) a virtual RTC 401 (virtual Real Time Clock 401) used when the OS 200 and OS 300 operate, and (ii) a virtual HPET 402 (virtual High Precision Event Timer 402) or the like that realizes a more detailed clock function than the virtual RTC 401 are implemented. However, although not shown in FIG. 1, other virtual devices that virtualize various hardware elements or circuits are also implemented on the hypervisor 400. The number and types of virtual devices and OSs operating on the hypervisor 400 are not limited to these.

Next, the operation of the above configuration will be described.

First, how the initial time is set in the clock function of each OS will be described based on the sequence of setting the time at the time of starting the vehicular apparatus 1.

When the power of the vehicular apparatus 1 is turned on, the OS is first started on the CPU module 100. In this embodiment, since the hypervisor 400 is provided as a function of the OS 200 as described above, the OS 200 is started first. However, in the case of a general virtualized environment, the hypervisor 400 will be started first.

Figure 4:
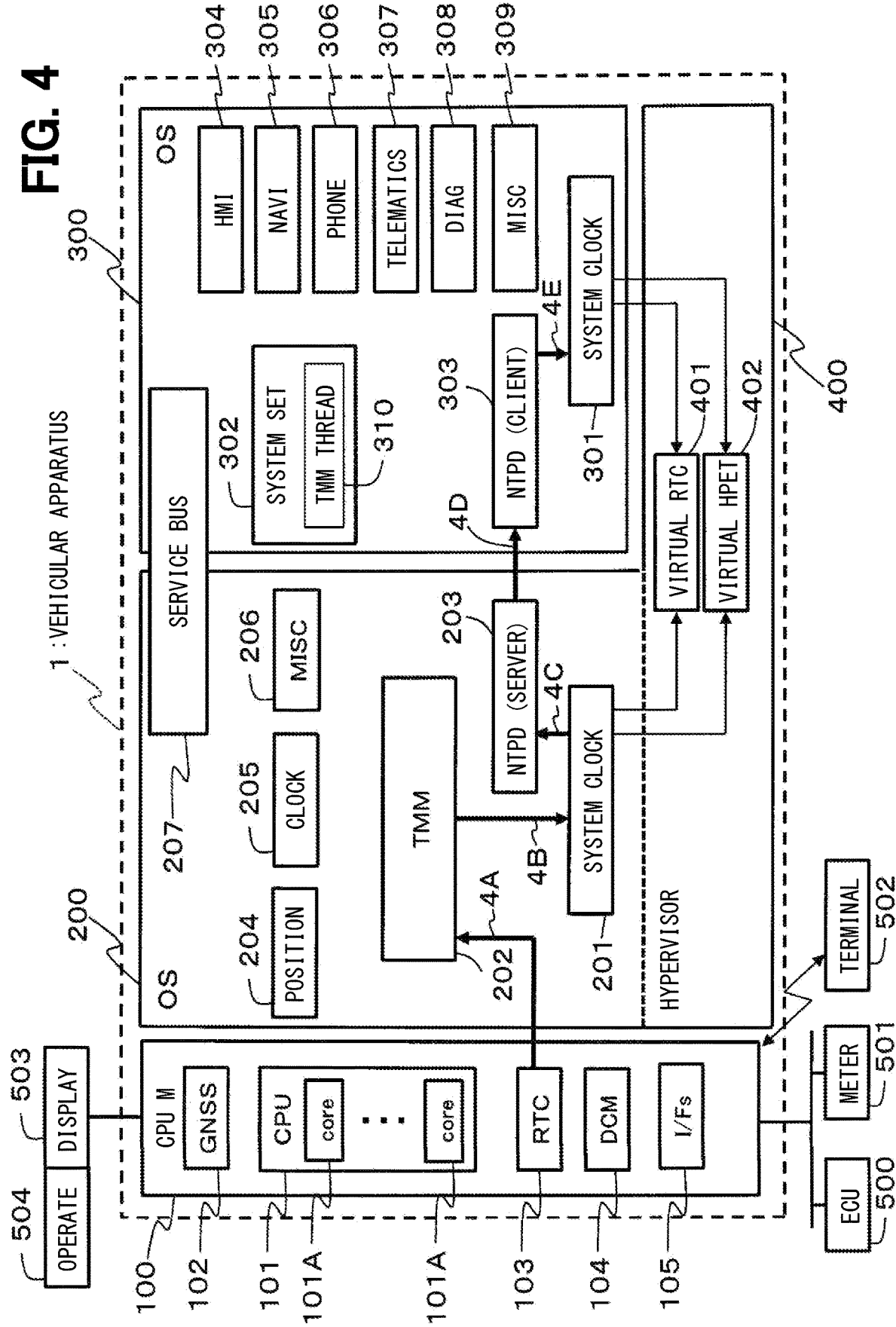
FIG. 4 is a diagram showing a sequence of setting a time at startup.

When the OS 200 starts, the TMM 202 starts operation. The TMM 202 that has started the operation acquires the time from the RTC 103 as shown by the arrow 4A in FIG. 4. Then, the TMM 202 sets the acquired time to the system clock 201 as indicated by the arrow 4B, and the server-side NTPD 203 acquires the acquired time from the system clock 201 as indicated by the arrow 4C. In this way, the basic time on the OS 200 is set and held.

Now, when the OS 200 starts, the hypervisor 400 also starts operating. At this time, the time is set in the virtual RTC 401 and the virtual HPET 402. Then, when the OS 300 is started on the hypervisor 400, the client-side NTPD 303 accesses the server-side NTPD 203 to acquire the time, as shown by the arrow 4D. After that, as shown by arrow 4E, the acquired time is set in the system clock 301, and the basic time is also set and held on the OS 300.

Therefore, the basic times of the OS 200 and the OS 300 are synchronized at the time of starting. Then, the OS 200 operates based on the system clock 201, and the OS 300 operates based on the system clock 301. Suppose a case where, as shown in FIG. 2, the time is displayed on the navigation screen while displaying the current time M1. In such a case, the current time M1 is displayed as the time based on the basic time held by the system clock 201 on the OS 200, and the current time M4 on the navigation screen is displayed based on the basic time held by the system clock 301 on the OS 300.

By the way, in a known technology, even if the time is changed by the application on the OS 200, the change is not reflected on the OS 300. It is assumed that the time is changed by a user or application, or the processing speed on the OS 300 is reduced in order to increase the processing capacity on the OS 200 as a case peculiar to a virtualized environment. In such assumption, there is a possibility that the time may be different between the OSs, that is, the time may not be synchronized between the OSs.

Then, in a state where the time is not synchronized between the OSs, various problems may occur in the vehicular apparatus 1. For example, in the example of FIG. 2, different times may be displayed on one screen, which may confuse the user. Further, in the case of the example shown in FIG. 3, for example, the time stamps of the position and the speed may be deviated, which may cause a problem during data analysis. In addition, due to the specifications of NTP, if a deviation of 1000 msec or more occurs, it becomes impossible to synchronize the time using NTP. Therefore, it may not be possible to synchronize the time between the OSs.

Therefore, the vehicular apparatus 1 is configured to synchronize the time of each OS by a synchronization unit, here, using the TMM 202, which synchronizes the time of each OS. The following will describe (i) several factors for changing the basic time of the vehicular apparatus 1 and (ii) the operations of the TMM 202 with respect to the factors. However, even if the factors are different from each other, (i) the operation of the application and (ii) the processing sequence of the TMM 202 and the TMM thread 310 are basically the same. Therefore, any of the factors will be described with reference to FIGS. 6 to 8 in which the processes related to the time change are extracted. Further, detailed description will be omitted for the portion where the processing overlaps in each factor.

Change of Basic Time Based on GNSS

GNSS can specify the current position and time using signals emitted from artificial satellites. In the vehicular apparatus 1, the GNSS module 102 receives the signals, and the position application 204 specifies the current position and the time. At this time, since the time used in the GNSS is very accurate, if the specified time is set as the basic time, the basic time of the vehicular apparatus 1 can be accurately maintained.

By the way, the position application 204 is an application that operates on the OS 200. Therefore, even if the basic time of the OS 200 is changed by the position application 204, the change is completed in the OS 200 alone and is not reflected on the OS 300. Therefore, when the time is specified, the position application 204 of the present embodiment notifies the TMM 202 of the time and entrusts the change of the basic time to the TMM 202.

Figure 5:
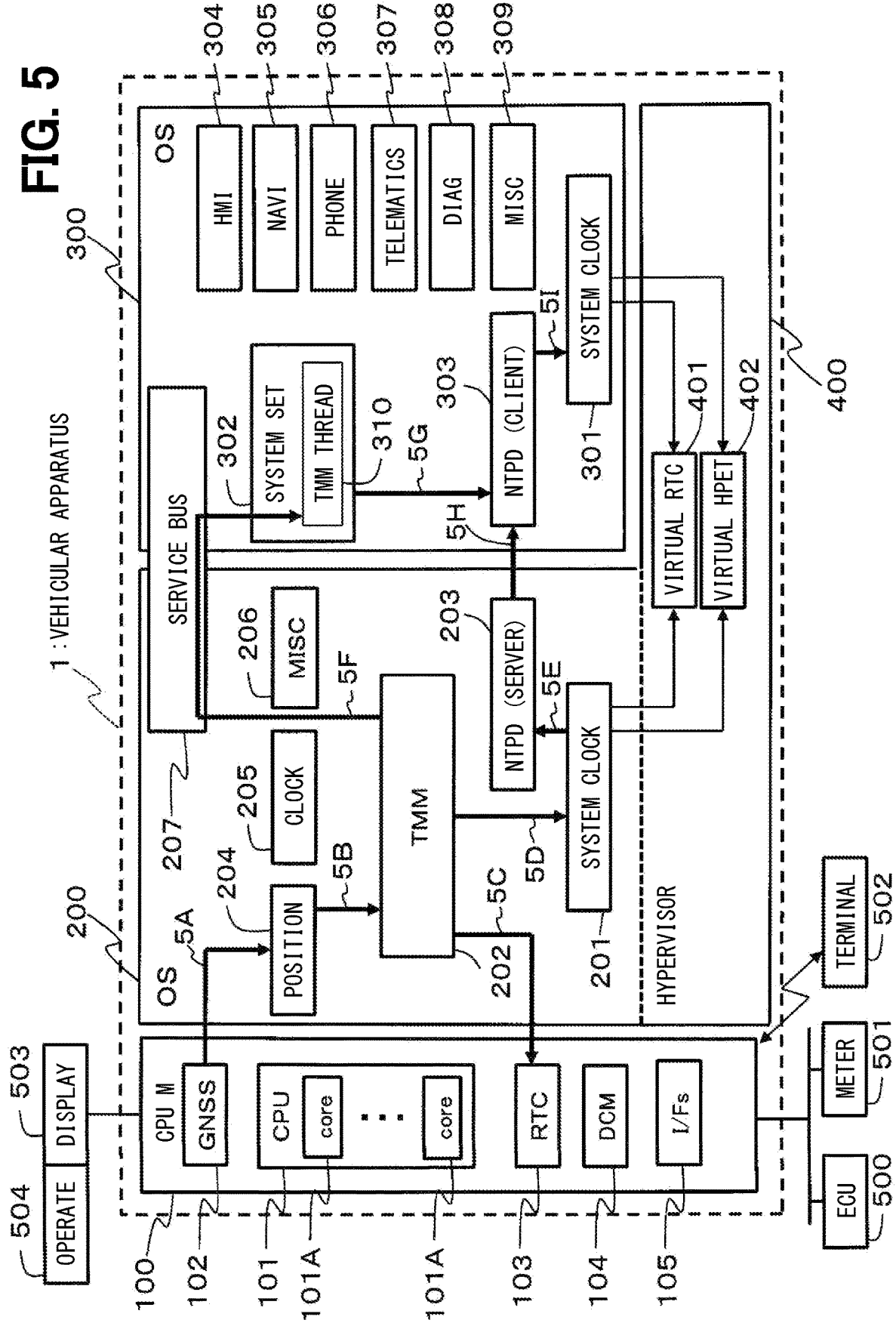
FIG. 5 is a diagram schematically showing an example of changing the time based on a GNSS.
Figure 6:
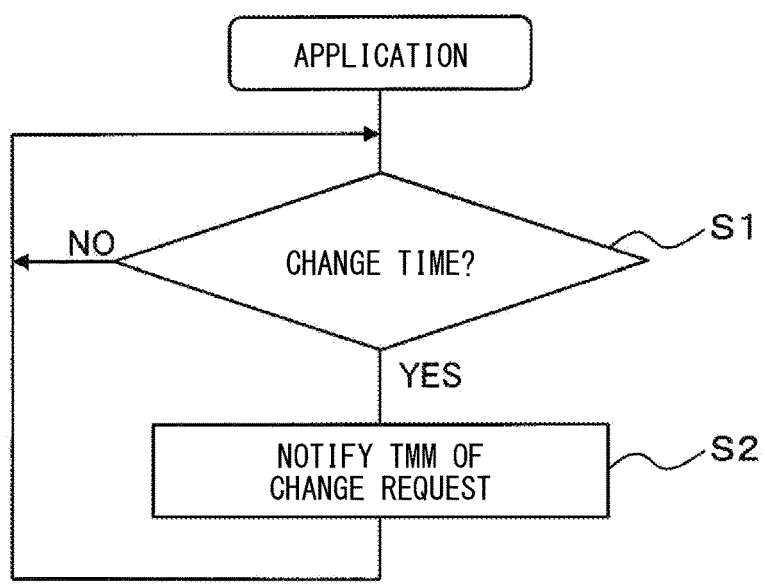
FIG. 6 is a diagram showing a sequence of changing the time in an application.

Specifically, the position application 204 specifies the position and time in response to receiving the data from the GNSS module 102 as shown by arrow 5A in FIG. 5. Subsequently, the position application 204 determines whether or not to change the time in step S1 as shown in FIG. 6. The position application 204 may become NO in step S1 and determine that the time is not changed, for example, when only a very short time has passed since the previous change. For example, if only a very short time has passed since the last change, the result is NO in step S1. In some cases, the position application 204 may determine that the time is not changed.

On the other hand, when the position application 204 determines that the time is changed, the result is YES in step S1. In step S2, the TMM 202 is notified of the time change request so as to change the time to the specified time as shown by the arrow 5B in FIG. 5. This time change request is notified to the TMM 202 as data of the time to be changed or data that can specify the time to be changed.

Figure 7:
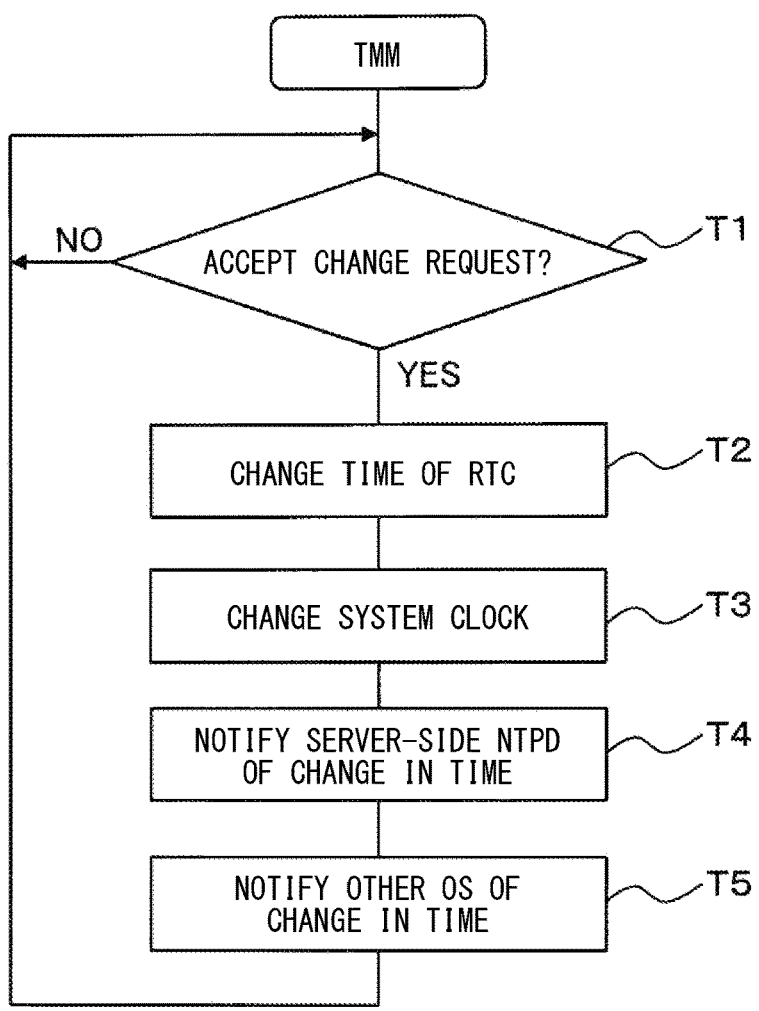
FIG. 7 is a diagram showing a sequence of changing the time in a TMM.

At this time, as shown in FIG. 7, the TMM 202 determines whether or not the change request from any of the applications has been accepted in step T1. Then, when the TMM 202 determines that the change request is not accepted, the result is NO in step T1, the process is proceeded to step T1 to wait for the change request. The processing sequence shown in FIG. 7 corresponds to the basic sequence of the synchronization process.

On the other hand, when the TMM 202 determines that the change request has been accepted, the result is YES in step T1, and the time of RTC 103 is changed in step T2 as shown by arrow 5C in FIG. 5. Subsequently, the TMM 202 changes the time of the system clock 201 in step T3 as shown by arrow 5D in FIG. 5, and notifies the NTPD 203 of the time change in step T4 as shown by arrow 5E in FIG. 5. In this case, the TMM 202 may directly notify the NTPD 203 of the time change.

Then, as shown by the arrow 5F in FIG. 5, the TMM 202 notifies the OS 300 of the time change (i.e., issues a notification of the time change) via the service bus 207 in step T5. More specifically, the TMM 202 notifies the TMM thread 310 operating on another OS 300 of the time change.

Figure 8:
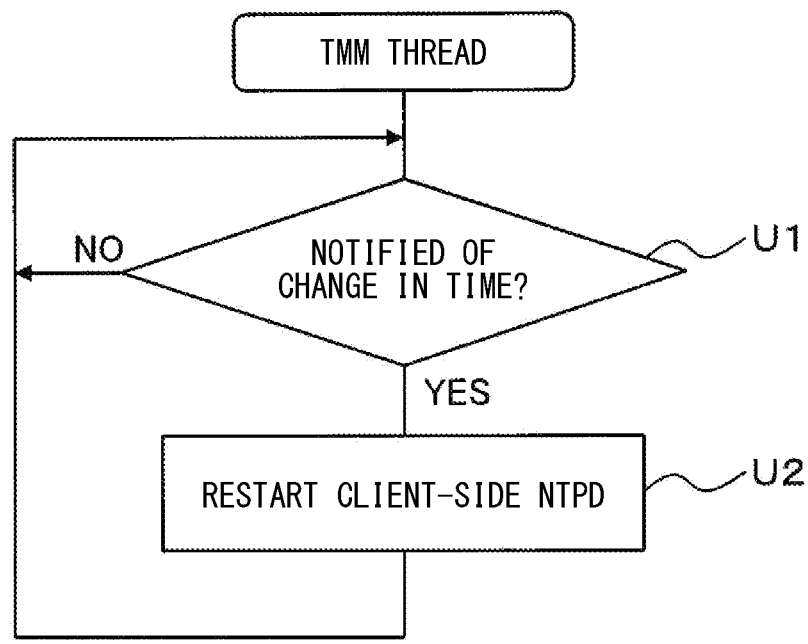
FIG. 8 is a diagram showing a sequence of changing the time in a TMM thread.

As shown in FIG. 8, the TMM thread 310 operating on the OS 300 determines whether or not the time change has been notified (i.e., whether to accept the notification of the time change) in step U1. If the TMM thread 310 determines that the time change has not been notified, the result is NO in step U1. The process is proceeded to step U1 to wait for the notification of the time change.

On the other hand, if the TMM thread 310 determines that the notification of the time change has been accepted, the result is YES in step U1. As shown by the arrow 5G in FIG. 5, the client-side NTPD 303 is restarted in step U2. Then, the restarted NTPD 303 acquires the time (i.e., the time held by the server-side NTPD 203) from the server-side NTPD 203 as shown by the arrow 5H in FIG. 5. The acquired time is set in the system clock 301 as shown by the arrow 5I. As a result, the time synchronized with the OS 200 is set and held in the system clock of the OS 300.

As described above, when the vehicular apparatus 1 changes the basic time based on the GNSS, the OS 300 is notified by the TMM 202 of the time change that occurs in the OS 200 (i.e., in the RTC 103, more strictly speaking). As a result, the time is synchronized between the OSs.

Change of Basic Time Based on User Operation

If the vehicular apparatus 1 is not provided with GNSS, the time cannot be specified by GNSS, so the user needs to set the current time. Further, even in a configuration including GNSS, some users are assumed to intentionally advance the displayed time beyond the accurate time so as not to be late for the schedule. Therefore, the vehicular apparatus 1 is provided with a clock application 205 that performs a process of changing the basic time by a user operation.

This clock application 205 is an application that operates on OS 200. Therefore, even if the basic time is changed by the clock application 205, the change is completed in the OS 200 alone and is not reflected in the OS 300. Therefore, the clock application 205 of the present embodiment is configured to notify the TMM 202 of the time when the time is set and entrust the change of the basic time to the TMM 202.

Figure 9:
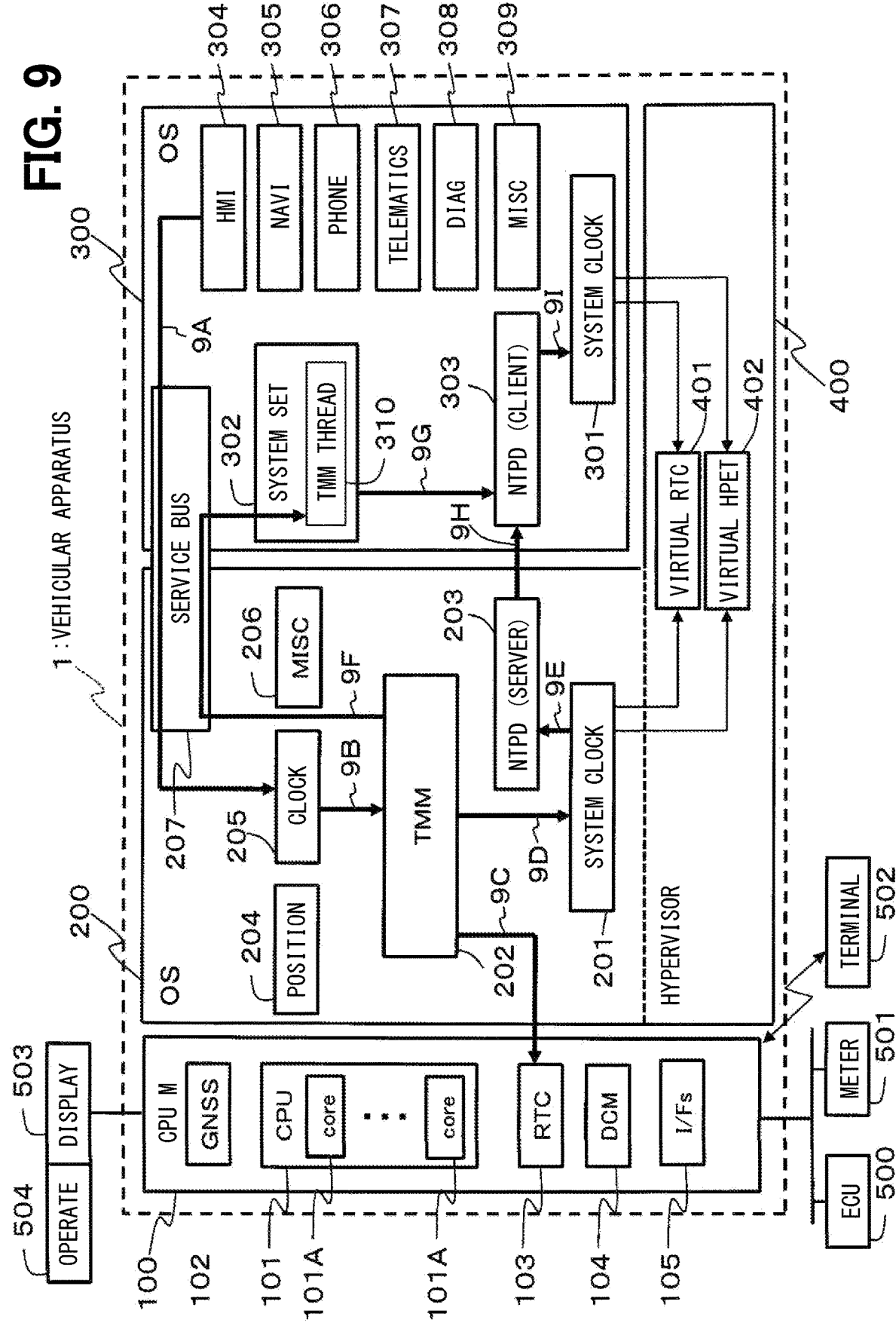
FIG. 9 is a diagram schematically showing an example of changing the time based on a user operation.

Specifically, when the user sets or changes the time, as shown by arrow 9A in FIG. 9, the HMI application 304 that accepts the input of the operation apparatus 504 notifies the clock application 205 of the operation content via the service bus 207. This operation content includes the time set by the user. That is, when the operation content is changing the time, the clock application 205 determines that the time is changed as shown in FIG. 6, and the result in step S1 is YES. As shown by the arrow 9B in FIG. 9, the TMM 202 is notified of the time change request in step S2.

Similar to the above-mentioned change of the basic time based on GNSS, when the TMM 202 determines that the time change request has been accepted as shown in FIG. 7, the result in step T1 is YES. The time of RTC 103 is changed in step T2 as shown by arrow 9C in FIG. 9, and the time of system clock 201 is changed in step T3 as shown by arrow 9D. The TMM 202 notifies the NTPD 203 of the time change in step T4 as indicated by the arrow 9E. Then, as shown by the arrow 9F in FIG. 9, the TMM 202 notifies the OS 300 of the time change via the service bus 207 in step T5.

When the TMM thread 310 operating on the OS 300 determines that the notification of the time change has been accepted as shown in FIG. 8, the result is YES in step U1. As shown by the arrow 9G in FIG. 9, the client-side NTPD 303 is restarted in step U2. Then, the restarted NTPD 303 acquires the time from the server-side NTPD 203 as shown by the arrow 9H in FIG. 9, and sets the acquired time in the system clock 301 as shown by the arrow 9I. As a result, the time synchronized with the OS 200 is set and held in the system clock 301 on the OS 300.

As described above, when the vehicular apparatus 1 changes the basic time based on the user's operation, the vehicular apparatus 1 notifies the OS 300 of the time change that occurs in the OS 200 (i.e., in the RTC 103) by the TMM 202. As a result, the time is synchronized between the OSs.

Further, in the configuration including GNSS, the difference between the time set by the user and the basic time stored up to that point is stored as an offset time. As a result, even if the time is changed by the position application 204, for example, the displayed time is the sum of the offset time. At this time, an accurate time is set in the RTC 103. Therefore, the vehicular apparatus 1 can operate at an accurate time while responding to the user's request to advance the displayed time.

On the other hand, in the configuration not provided with GNSS, the time set by the user is set as the basic time of the vehicular apparatus 1. In this case, if it is connected to the portable terminal 502 and the accurate time can be acquired, or if the accurate time can be acquired by the DCM 104, the basic time of the vehicular apparatus 1 can be updated, or the offset time can be treated as described above.

Change of Basic Time Based on Connection with Portable Terminal 502

The vehicular apparatus 1 can operate in cooperation with the portable terminal 502 held by the user as described above. Then, it is considered that the portable terminal 502 holds an accurate time via the communication line. In other words, if the time of the portable terminal 502 is acquired, it is considered that the basic time of the vehicular apparatus 1 can be set to an accurate time. Therefore, the vehicular apparatus 1 is provided with a telephone application 306 that performs a process of changing the basic time of the vehicular apparatus 1 based on the time stored in the connected portable terminal 502.

This telephone application 306 is an application that operates on the OS 300. Therefore, even if the basic time is changed by the telephone application 306, the change is completed in the OS 300 alone and is not reflected in the OS 200. Therefore, when the telephone application 306 of the present embodiment is connected to the portable terminal 502 and specifies the time, the specified time is notified to the TMM 202 and the change of the basic time is entrusted to the TMM 202.

Figure 10:
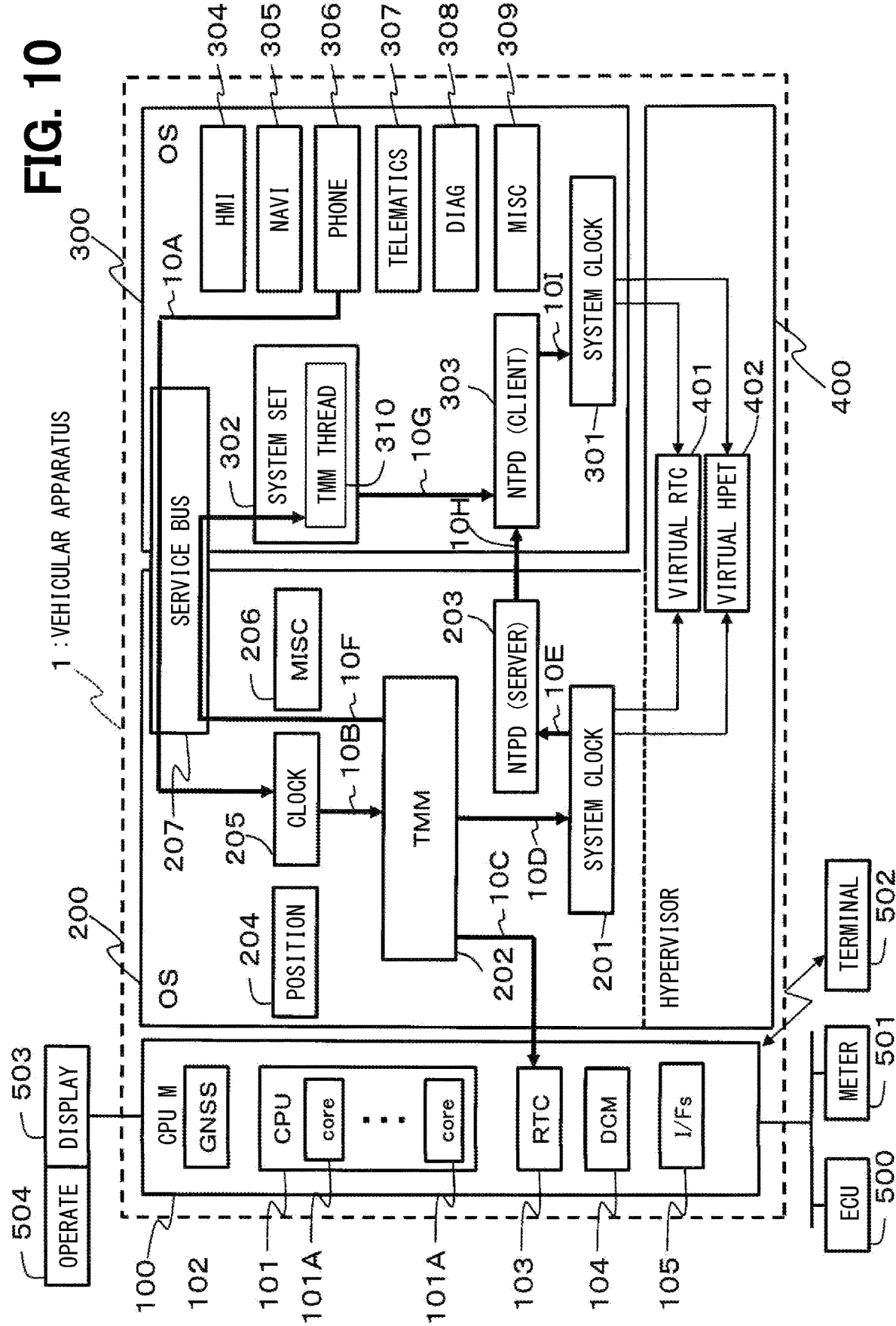
FIG. 10 is a diagram schematically showing an example of changing the time based on a connection with a portable terminal.

Specifically, the telephone application 306 acquires the time stored in the portable terminal 502 when the portable terminal 502 is communicably connected to the vehicular apparatus 1. Then, since the telephone application 306 is able to acquire the accurate time, it is determined that the time is changed as shown in FIG. 6 and the result is YES in step S1. As shown by the arrow 10A in FIG. 10, the TMM 202 is notified of the time change request in step S2.

Similar to the above-mentioned change of the basic time based on GNSS, when the TMM 202 determines that the time change request has been accepted as shown in FIG. 7, the result is YES in step T1. The time of the RTC 103 is changed in step T2 as shown by arrow 10B in FIG. 10, the time of the system clock 201 is changed in step T3 as shown by arrow 10C. The TMM 202 notifies the NTPD 203 of the time change in step T4 as indicated by the arrow 10D. Then, as shown by the arrow 10E in FIG. 10, the TMM 202 notifies the OS 300 of the time change via the service bus 207 in step T5.

When the TMM thread 310 operating on the OS 300 determines that the change notification has been received as shown in FIG. 8, the result is YES in step U1. As shown by the arrow 10F in FIG. 10, the client-side NTPD 303 is restarted in step U2. Then, the restarted NTPD 303 acquires the time from the server-side NTPD 203 as shown by the arrow 10G in FIG. 10, and sets the acquired time in the system clock 301 as shown by the arrow 10H. As a result, the system clock 301 of the OS 300 sets and holds the time synchronized with the OS 200.

In this way, when the vehicular apparatus 1 is connected to the portable terminal 502, the TMM 202 notifies the OS 200 of the time change that typically occurs only on the OS 300. As a result, the time change is reflected in the RTC 103 and the time is synchronized between the OSs.

Change of Basic Time Based on DCM 104

The vehicular apparatus 1 includes the DCM 104 as described above. The DCM 104 is configured to be able to communicate with the center via a communication line, and the time can be acquired from the center. That is, it is considered that the vehicular apparatus 1 can set the basic time to an accurate time based on the time acquired by the DCM 104. Therefore, the vehicular apparatus 1 is provided with a telematics application 307 that performs a process of changing the basic time of the vehicular apparatus 1 based on the time acquired via the DCM 104.

This telematics application 307 is an application that operates on the OS 300. Therefore, even if the basic time is changed by the telematics application 307, the change is completed in the OS 300 alone and is not reflected in the OS 200. Therefore, the telematics application 307 of the present embodiment is configured to notify the TMM 202 of the time when the time is specified and entrust the change of the basic time to the TMM 202.

Figure 11:
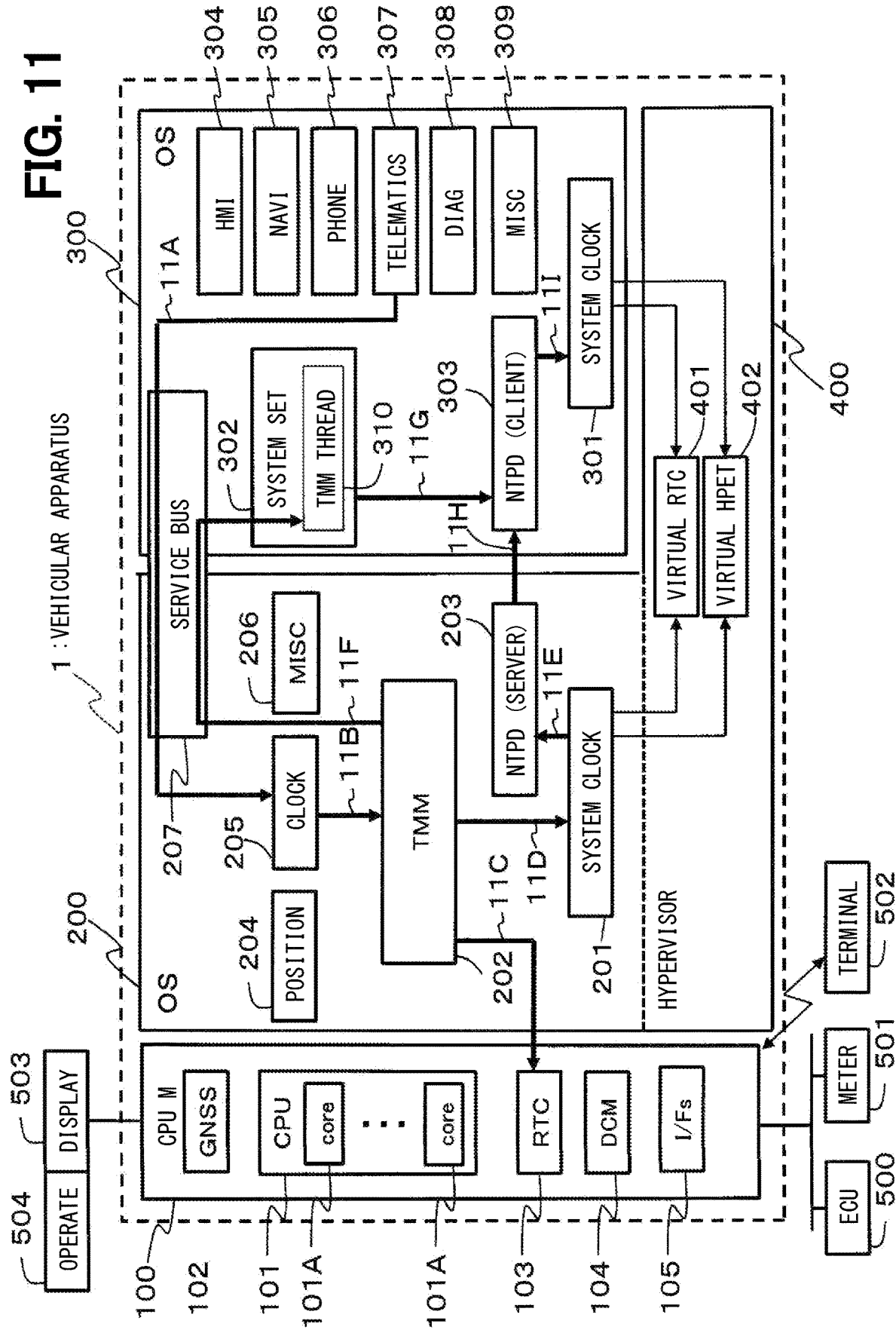
FIG. 11 is a diagram schematically showing an example of changing the time based on a DCM.

Specifically, when the telematics application 307 acquires the time via the DCM 104, it can acquire the accurate time. Therefore, it is determined that the time is changed as shown in FIG. 6, and the result in step S1 becomes YES. As shown by the arrow 11A in FIG. 11, the TMM 202 is notified of the time change request in step S2.

Similar to the above-mentioned change of the basic time based on GNSS, when the TMM 202 determines that the time change request has been accepted as shown in FIG. 7, the result in step T1 becomes YES. The time of the RTC 103 is thereby changed in step T2 as shown by arrow 11B in FIG. 11, and the time of the system clock 201 is changed in step T3 as shown by arrow 11C. The TMM 202 notifies the NTPD 203 of the time change in step T4 as indicated by the arrow 11D. Then, as shown by the arrow 11E in FIG. 11, the TMM 202 notifies the OS 300 of the time change via the service bus 207 in step T5.

When the TMM thread 310 operating on the OS 300 determines that the change notification has been accepted as shown in FIG. 8, the result is YES in step U1. As shown by the arrow 11F in FIG. 11, the client-side NTPD 303 is restarted in step U2. Then, the restarted NTPD 303 acquires the time from the server-side NTPD 203 as shown by the arrow 11G in FIG. 11, and sets the acquired time in the system clock 301 as shown by the arrow 11H. As a result, the time synchronized with the OS 200 is set and held in the system clock of the OS 300.

In this way, the vehicular apparatus 1 notifies, by the TMM 202, the OS 200 of the time change, which may occur typically only on the OS 300 based on the time acquired via the DCM 104. As a result, the time change is reflected in the RTC 103 and the time is synchronized between the OSs.

As described above, the vehicular apparatus 1 synchronizes the times of the plurality of OSs 200 and 300 operating on the CPU module 100 by the TMM 202 as a synchronization unit for synchronizing the times with each other. Even when the time is changed by an application other than the application exemplified in this embodiment, the times can be synchronized between OSs in the same manner by using the TMM 202.

According to the embodiment described above, the following effects can be achieved.

The vehicular apparatus 1 has a virtualized environment in which a plurality of OSs such as OS 200 and OS 300 operate concurrently on a single CPU module 100. Here, the OS 200 and the OS 300 operate based on their respective system clocks, that is, their own clock functions. In this case, in general, the change made on one OS may be completed within the one OS and may not be notified to other OSs. Therefore, even if the time is changed on a certain OS, the change is not reflected on the other OS, and there is a possibility that the time is not synchronized between the OSs.

On the other hand, the vehicular apparatus 1 according to the present embodiment is configured to notify the other OS of the time change performed in any one OS by the TMM 202 corresponding to the synchronization unit, and synchronizes the time of each OS. By providing such a synchronization unit, the vehicular apparatus 1 notifies the other OS of the time change performed on one of the OSs. Then, if the time change is notified, the time can be changed by the OS on the notified side.

Therefore, the time can be synchronized between a plurality of OSs operating on the CPU module 100. And if the time is synchronized between OSs, the risk of involving the following problems may be reduced. For instance, the problem may be involved such that different times are displayed on one display apparatus 503 to thereby confuse users or not to arrange log time stamps in chronological order. Further, even when a plurality of display apparatuses 503 are connected to the vehicular apparatus 1, it is possible to prevent the display apparatuses 503 from displaying different times.

In addition, there may be provided a time synchronization method including a synchronization process that synchronizes the time of each OS by notifying the other OS of the time change performed on one of the OSs. Further, there may be provided a computer program that causes a controller (i.e., the CPU module 100) of the vehicular apparatus 1 to execute the synchronization process or the time synchronization method. Such a time synchronization method or a computer program is also capable of synchronizing the time between a plurality of OSs operating on the CPU module 100, and reducing the possibility of posing the problem that displays different times on one display apparatus 503 to confuse the user, or the problem that does not arrange the time stamps of logs in chronological order.

The vehicular apparatus 1 has an application implemented on the CPU module 100 for acquiring the time from the outside of the vehicular apparatus 1. Then, the synchronization unit changes the time based on the time acquired by the application that acquires the time, and notifies each OS that the time has been changed. That is, each application entrusts the process of actually changing the time to the TMM 202. As a result, the accurate time can be maintained, and the notification to each OS when the time is changed can be ensured.

In this case, the application, which acquires the time, notifies the synchronization unit of the change request requesting the change of the time. Then, when the synchronization unit receives the change request, it changes the time of the RTC 103 and notifies each OS that the time of the RTC 103 has been changed. As a result, the basic time of the vehicular apparatus 1 can be changed based on the acquired accurate time, and the basic time of each OS is changed based on the accurate time. Therefore, the time can be synchronized in the entire vehicular apparatus 1. Further, the process of actually changing the time is entrusted to the TMM 202; namely, the change in the time of the RTC 103, which is the reference of the vehicular apparatus 1, is limited to the synchronization unit. Thereby, it is possible to ensure the notification to each OS when the time is changed.

The TMM 202 as a synchronization unit may be implemented as an application on any one OS. In other words, since the synchronization unit is realized by software, there is no need to change additional hardware or existing hardware. Therefore, the synchronization unit can be easily provided in the vehicular apparatus 1, and the synchronization unit can be easily provided in the existing apparatus.

As an application for acquiring the time from the outside of the vehicular apparatus 1, the vehicular apparatus is provided with an application that accepts a time change from the satellite positioning system, such as the position application 204 of the embodiment. As a result, if an accurate time is acquired based on GNSS, the accurate time can be set as the basic time of each OS and the vehicular apparatus 1. Therefore, the vehicular apparatus 1 can be operated based on an accurate time.

As an application for acquiring the time from the outside of the vehicular apparatus 1, the vehicular apparatus 1 is provided with an application that accepts a time change from a user, such as the clock application 205 of the embodiment. As a result, the time desired by the user can be set as the basic time of the vehicular apparatus 1. Therefore, the vehicular apparatus 1 can be operated based on the time desired by the user.

As an application for acquiring the time from the outside of the vehicular apparatus 1, the vehicular apparatus 1 is provided with an application that accepts a time change from the portable terminal 502, such as the telephone application 306 of the embodiment. It is considered that the portable terminal 502 acquires the accurate time via the communication line. Therefore, if an accurate time is acquired by connecting to a mobile phone, the accurate time can be set as the basic time of each OS and the vehicular apparatus 1. Therefore, the vehicular apparatus 1 can be operated based on an accurate time.

As an application for acquiring the time from the outside of the vehicular apparatus 1, the vehicular apparatus 1 is provided with an application that accepts a time change from the DCM 104, such as the telematics application 307 of the embodiment. It is considered that the DCM 104 acquires the accurate time via the communication line. Therefore, if an accurate time is acquired based on the DCM 104, the accurate time can be set as the basic time of each OS and the vehicular apparatus 1. Therefore, the vehicular apparatus 1 can be operated based on an accurate time.

Further, the vehicular apparatus 1 is implemented with the server-side NTPD 203 and client-side NTPD 303, and thus synchronizes the time by NTP. As a result, time synchronization can be easily performed using an existing protocol, and it is possible to prevent a slight deviation in the time of each OS due to the time required for notification.

In addition, since the client-side NTPD 303 is restarted when the time is changed, the time of each OS can be synchronized even if the time shift exceeds the NTP specifications.

In the embodiment, an example of notifying the TMM thread 310 that the time has been changed from the TMM 202 has been shown, but the changed time may be notified to the TMM thread 310 or another OS.

In the embodiment, an example of implementing the TMM 202 as a synchronization unit on the OS 200 is shown, but the TMM 202 may be implemented on the hypervisor 400. That is, the synchronization unit can be implemented as an application on the hypervisor 400 that operates each OS. Even with such a configuration, the time of each OS can be synchronized as in the above-described embodiment.

Further, in the embodiment, an example is shown in which the server-side NTPD 203 is implemented on the OS 200, and the OS 200, that is, the OS operating on the hypervisor 400 becomes a master when synchronizing the time. However, the server-side NTPD 203 may be implemented on the hypervisor 400, and the client-side NTPD 303 may be implemented on each OS. That is, the hypervisor 400 may be configured as a master when synchronizing the time. Even with such a configuration, the time of each OS can be synchronized as in the above-described embodiment.

In the embodiment, an example of implementing the hypervisor 400 by the function of the OS 200 is shown. However, there is a general virtualized environment configuration in which a dedicated hypervisor 400 is implemented on the CPU module 100 and a plurality of OSs are operated on the hypervisor 400. In such general virtualized environment configuration, the time can be synchronized between the OSs by the method and the program shown in the embodiment. In that case, the TMM 202 or the server-side NTPD 203 can be implemented on the OS as in the embodiment, or can be implemented on the hypervisor 400.

In the embodiment, an example of restarting the client-side NTPD 303 by the TMM thread 310 is shown. However, it is also possible to notify the client-side NTPD 303 of the reacquisition of the time and restart the time if the reacquisition cannot be performed.

In the embodiment, a configuration in which one CPU 101 is provided on one CPU module 100 is illustrated. However, a so-called multiprocessor configuration in which a plurality of CPU 101s are provided on one CPU module 100 and the hypervisor 400 is operated on the plurality of CPUs 101 can also be used. That is, it is possible to provide a synchronization unit in one virtualized environment constructed in one vehicular apparatus 1. Even with such a configuration, the time of each OS can be synchronized as in the embodiment.

It should be understood that the present disclosure described based on the embodiments is not limited to the embodiment or structures presented herein. The present disclosure also includes various modifications and modifications within an equivalent range. In addition, various combinations and forms, and further, other combinations and forms including only one element, or more or less than these elements are also within the sprit and the scope of the present disclosure.

The controller (i.e., the CPU module 100) and method described in the present disclosure in the above embodiment may be implemented by one or more special-purpose computers. Such computers may be created (i) by configuring (a) a memory and a processor programmed to execute one or more particular functions embodied in computer programs, or (ii) by configuring (b) a processor provided by one or more special-purpose hardware logic circuits, or (iii) by configuring a combination of (a) a memory and a processor programmed to execute one or more particular functions embodied in computer programs and (b) a processor provided by one or more special-purpose hardware logic circuits. The computer programs may be stored, as instructions to be executed by a computer, in a tangible non-transitory computer-readable storage medium.

For reference to further explain features of the present disclosure, the description is added as follows.

Vehicles are provided with a clock function in order to present the time to the user and to operate the in-vehicle system correctly. For example, there is disclosed a technology to maintain an accurate time by synchronizing with an external network time protocol server. Hereinafter, the network time protocol is also referred to as NTP.

There is a vehicular apparatus that concurrently operate a plurality of operating systems on a single hardware module. Hereinafter, the operating system is also referred to as an OS. In such a vehicular apparatus, for example, an application that requires real-time performance, an application that displays an image, or the like is assigned to each OS according to the required processing speed and characteristics to be operated. Each OS has its own clock function, and each application operates by using the clock function of the OS implementing each OS.

There may be a case where even if the time is changed in an application in one OS, such a change in the one OS is not reflected in another OS. Therefore, a plurality of OSs may operate in a state where the times are out of synchronization, that is, in a state where the times are not synchronized.

Then, when the times of the respective OSs are not synchronized, for example, there is a concern that a problem may occur in a diagnostic function where the vehicle information collected by one OS is recorded by another OS in time series. There is becoming widespread an apparatus provided with an in-vehicle infotainment function that provides information and entertainment. There may be a case where one OS is executing an application that displays the current time, and another OS is executing a route guidance application. Such a case may cause a concern that different times may be simultaneously displayed to thereby confuse the user.

It is thus desired to provide a vehicular apparatus and a time synchronization method for the vehicular apparatus, which are capable of synchronizing the times of a plurality of OSs operated concurrently on a single CPU module.

An aspect of the present disclosure described herein is set forth in the following clauses.

According to an aspect of the present disclosure, a vehicular apparatus for a vehicle is provided to operate concurrently a plurality of operating systems on a single hardware module. The plurality of operating systems operate respectively based on corresponding own clock functions. The vehicular apparatus includes a network time protocol server, a network time protocol client, and a synchronization unit. The network time protocol server is provided on any one of the plurality of operating systems. The network time protocol client is configured to acquire a time by communicating with the network time protocol server. The synchronization unit is configured to issue, to each of the plurality of operating systems, a notification of a change in the time made on any one of the plurality of operating systems and synchronize the time of each of the plurality of operating systems. Herein, the synchronization unit is further configured to synchronize the time of each of the plurality of operating systems by causing the network time protocol client to restart in response to receiving the notification of the change in the time.

With such a configuration, the time of each operating system can be synchronized, or the respective times of a plurality of operating systems can be synchronized with each other.

What is claimed is:

1. A vehicular apparatus for a vehicle, the vehicular apparatus operating concurrently a plurality of operating systems on a single hardware module, the plurality of operating systems operating based on corresponding own clock functions,
   the vehicular apparatus comprising:
   a network time protocol server and a network time protocol client,
      the network time protocol server being provided on any one of the plurality of operating systems,
      the network time protocol client being configured to acquire a time by communicating with the network time protocol server; and
   a synchronization unit configured to
      issue, to each of the plurality of operating systems, a notification of a change in the time made on any one of the plurality of operating systems, and
      synchronize the time of each of the plurality of operating systems,
   wherein:
   the synchronization unit is further configured to synchronize the time of each of the plurality of operating systems by causing the network time protocol client to restart in response to receiving the notification of the change in the time;
   the synchronization unit is implemented by one or more special-purpose computers; and the one or more special-purpose computers is provided by at least one of: a memory and a processor programmed to execute one or more particular functions embodied in computer programs; a processor provided by one or more special-purpose hardware logic circuits; and a combination of a memory and a processor programmed to execute one or more particular functions embodied in computer programs and a processor provided by one or more special-purpose hardware logic circuits.

2. The vehicular apparatus according to claim 1, wherein:
   an application configured to acquire the time from an outside of the vehicular apparatus is implemented on the hardware module; and
   the synchronization unit is further configured to
      make the change in the time based on the time acquired by the application that acquires the time, and
      issue, to each of the plurality of operating systems, a notification that indicates that the time is changed.

3. The vehicular apparatus according to claim 1, wherein:
   an application configured to acquire the time from an outside of the vehicular apparatus is implemented on the hardware module; and
   in response to receiving a request of the change in the time, the synchronization unit is further configured to
      make the change in the time of a real-time clock provided in the hardware module, and
      issue, to each of operating systems, a notification that indicates that the time of the real-time clock is changed.

4. The vehicular apparatus according to claim 1, wherein:
   the synchronization unit is implemented as an application on any one of the plurality of operating systems.

5. The vehicular apparatus according to claim 1, wherein:
   the synchronization unit is implemented as an application on a hypervisor that runs the plurality of operating systems.

6. The vehicular apparatus according to claim 2, wherein:
   as the application acquiring the time from the outside of the vehicular apparatus, an application configured to accept the change in the time from a satellite positioning system is implemented.

7. The vehicular apparatus according to claim 2, wherein:
   as the application acquiring the time from the outside of the vehicular apparatus, an application configured to accept the change in the time from a user is implemented.

8. The vehicular apparatus according to claim 2, wherein:
   as the application acquiring the time from the outside of the vehicular apparatus, an application configured to accept the change in the time from a portable terminal is implemented.

9. The vehicular apparatus according to claim 2, wherein:
   as the application acquiring the time from the outside of the vehicular apparatus, an application configured to accept the change in the time from a data communicator apparatus provided in the vehicle is implemented.

10. A computer-implemented time synchronization method for synchronizing a time of each of a plurality of operating systems concurrently operating, each of the plurality of operating systems operating based on the time provided by a corresponding own clock function, wherein (i) each of the plurality of operating systems, (ii) a network time protocol server and (iii) a network time protocol client are implemented on a single hardware module in a vehicular apparatus for a vehicle, the time synchronization method comprising:

issuing, to each of the plurality of operating systems, a notification of a change in the time made on one of the plurality of operating systems; and synchronizing the time of each of the plurality of operating systems by (i) restarting the network time protocol client in response to receiving the notification of the change in the time, and (ii) then acquiring the time by communicating with the network time protocol server.

11. The computer-implemented time synchronization method according to claim 10, further comprising:

receiving a request of the change in the time from the one of the plurality of operating systems;

changing the time in a real-time clock provided in the hardware module in response to receiving the request of the change in the time;

issuing the notification of the change in the time to the network time protocol server, in addition to each of the plurality of operating systems, to cause the network time protocol server to change the time in response to receiving the request of the change in the time; and synchronizing the time of each of the plurality of operating systems by causing the network time protocol client to restart in response to receiving the notification of the change in the time and acquire newly the time from the network time protocol server.

12. An apparatus installable in a vehicle, the apparatus comprising a single hardware module, the hardware module comprising:

a memory storing instructions; and a processor that executes the instructions to, with the apparatus installed in the vehicle, implement:

a plurality of operating systems operating concurrently, each of the plurality of operating systems operating based on a time provided by a clock corresponding to each of the plurality of operating systems, a network time protocol server holding the time;

a network time protocol client configured to acquire the time held by the network time protocol server through communicating with the network time protocol server, wherein the time provided by the corresponding clock of each of the plurality of operating systems is enabled to be changed by the network time protocol client; and a synchronization unit configured to issue a notification of a change in the time based on a request issued by one of the plurality of operating systems, (i) to the network time protocol server and (ii) to the network time protocol client, wherein in response to receiving the notification of the change in the time, (i) the network time protocol sever is configured to change the time held by the network time protocol server itself, and (ii) the network time protocol client is configured to restart and then acquire the time changed and held by the network time protocol server through communicating with the network time protocol server, causing the times of the plurality of operating systems to be synchronized with each other, wherein the synchronization unit is implemented by one or more special-purpose computers, and wherein the one or more special-purpose computers is provided by at least one of: a memory and a processor programmed to execute one or more particular functions embodied in computer programs; a processor provided by one or more special-purpose hardware logic circuits; and a combination of a memory and a processor programmed to execute one or more particular functions embodied in computer programs and a processor provided by one or more special-purpose hardware logic circuits.

13. The apparatus according to claim 12, wherein:

in cases that the synchronization unit is implemented on one of the plurality of operating systems, the time provided by the corresponding clock of the one of the plurality of operating systems is configured to be enabled to be changed by the synchronization unit.

14. The apparatus according to claim 12, wherein:

the processor further executes the instructions to implement, on the one of the plurality of operating systems, an application configured to acquire the time from an outside of the vehicular apparatus and issue the request of the change in the time to the synchronization unit; and in response to receiving the request of the change in the time from the one of the plurality of operating systems, the synchronization unit is further configured to make the change in the time of a real-time clock provided in the hardware module, and issue a notification that indicates that the time of the real-time clock is changed.

* * * * *